(No Model.)
N. BARRY, Jr.
PLUMBER'S TRAP.
No. 384,114. Patented June 5, 1888.
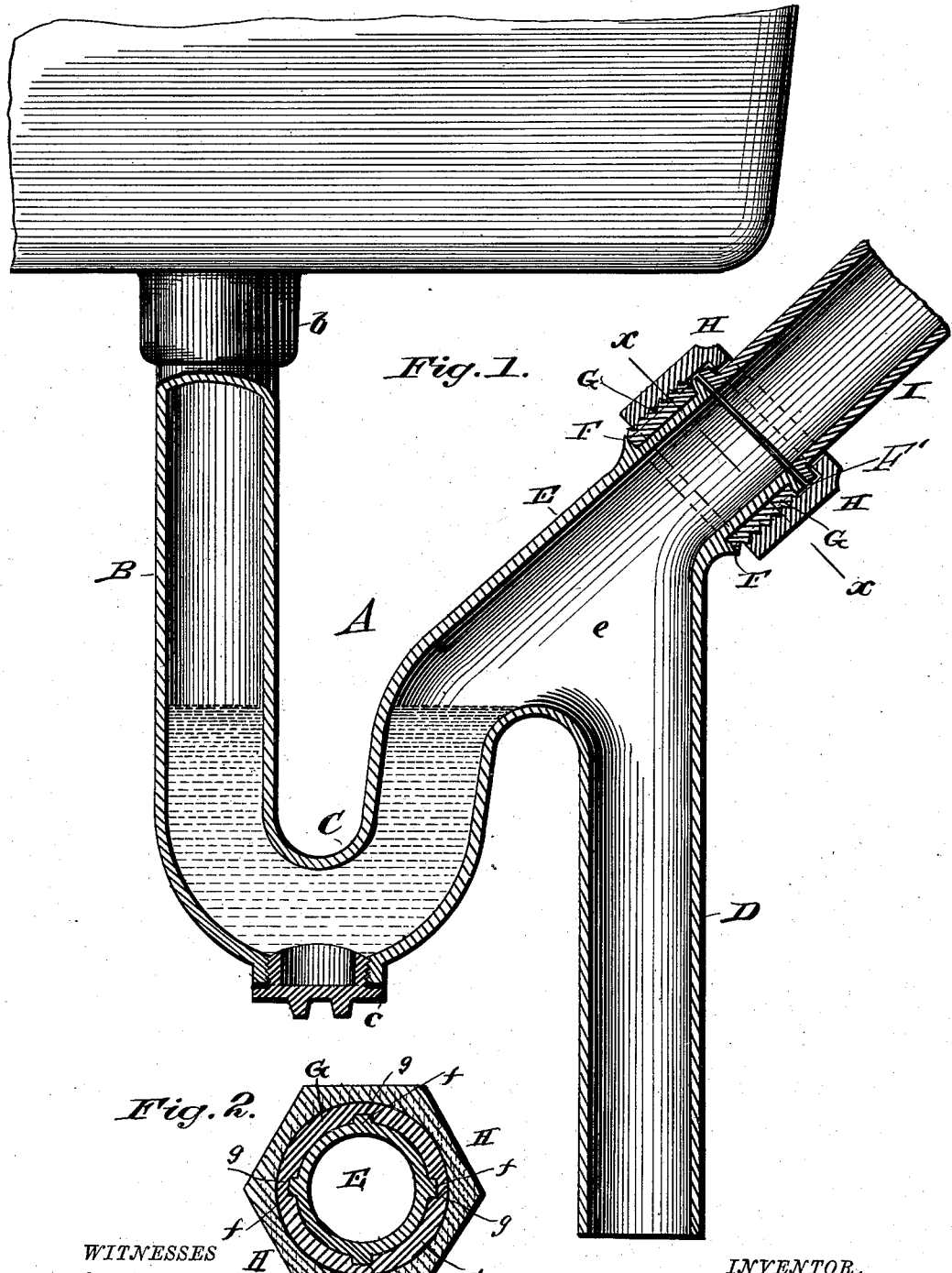

UNITED STATES PATENT OFFICE.

NICHOLAS BARRY, JR., OF MUSCATINE, IOWA.

PLUMBER'S TRAP.

SPECIFICATION forming part of Letters Patent No. 384,114, dated June 5, 1888.

Application filed April 9, 1887. Renewed March 10, 1888. Serial No. 266,830. (No model.)

*To all whom it may concern:*

Be it known that I, NICHOLAS BARRY, Jr., of Muscatine, in the county of Muscatine and State of Iowa, have invented certain new and useful Improvements in Plumbers' Traps; and I do hereby declare that the following is a full, clear, and exact description thereof, reference being had to the accompanying drawings, and to the letters of reference marked thereon, which form part of this specification, in which—

Figure 1 is a central vertical section of my improved pipe-trap, showing it in position for use. Fig. 2 is a detail cross-section of the trap on line *x x*, Fig. 1, showing the connection of the vent and gas-exit pipe.

This invention relates to improvements in sewer-pipe traps for plumbers' use; and it has for its objects to provide an improved S-trap that can be connected directly to a basin or sink without the use of an intermediate pipe-joint, and to so construct the said trap that it can be conveniently and quickly connected by its vent with the gas-exit or ventilating pipe, or disconnected therefrom after the trap has been secured in position.

The invention consists in the peculiar form and novel construction of the parts of the trap, as will be fully understood from the following description, when taken in connection with the annexed drawings.

Before proceeding with the description of my present invention I will state that it is an improvement on the trap patented to me October 3, 1882, and numbered 265,372. In said trap the vent or gas-exit stands in parallel lines with the stems of the trap, and could not be conveniently connected to the ventilating-pipe if the trap was first secured in position unless it was connected with the vessel by an extra pipe-section, so that the trap would be sufficiently below the bottom of said vessel to allow the connections of the vent and gas-pipe to be made. The present invention obviates the use of such extra pipe-section and presents a more convenient form of vent-opening for connection with the gas-pipe than has heretofore been obtained.

Referring to the drawings by letter, A designates the main body of the trap, formed of proper metal pipe and of general S form or shape, having the usual receiving vertical part B, the gas-check or water-seal bend C, and the vertical exit portion D, standing in an opposite direction to part B. The lowermost part of bend C may be provided with an ordinary opening and screw-plug, *c*, as shown, for clearing the seal of any deposits.

E designates the vent of the trap, which is formed above the part D, and its mouth extends outward in an upwardly-inclined angle therefrom, as shown. The top wall of the vent is a continuation of the top wall of bend C, as shown, and its lower wall is a continuation of the wall of part D, so that a chamber, *e*, is formed at the junction of bend C and part D, which chamber is of much larger diameter than either of said parts, but is reduced in diameter as it approaches the mouth of the vent, where it assumes about the same size as part D.

F designates an annular shoulder formed on the outside of vent E near its mouth, and upon which is seated on the vent an annular screw-threaded ring, G, which is formed with one or more grooves or recesses, *g*, as shown. The mouth of vent E is provided with lips *f*, which stand outward at right angles to the body of the vent and lie within the grooves *g*, so that ring G is prevented from escaping from the vent or turning thereon, as is evident.

At the upper end of the vent E an annular flange, F', is formed, between which and the shoulder F is confined the screw-threaded ring G, above referred to. It will be seen that the parts B C D E and F F' are formed integral, and that the ring is prevented from rotating by reason of the ribs or lips *f*, and that this ring is prevented from receiving endwise movement by reason of the flanges on shoulders F F'.

H designates an internally-screw-threaded collar adapted to engage with ring G, and provided with an inner annular flange at its upper end, adapted to engage a flange on the end of a pipe, I, and rigidly connect the same with vent E, as shown. The pipe I forms the ventilating or gas pipe of the trap, and may be either straight or bent in any desired form.

In order to make my improved trap more readily applicable to earthenware basins, the vents of which are ordinarily much larger in diameter than the drain-pipe from the same, necessitating the employment of a supplementary collar soldered on the end of the trap or drain-pipe to connect same with basin, I form the upper end of arm B of my trap with the swell or enlargement b, as shown, which is of sufficiently greater diameter than part B to fit over the vent of the basin, but is integral with part B. This construction saves a great amount of time and annoyance in fitting the trap to the basin, and is a very useful feature.

It will be observed that by the described construction of my trap I can connect its arm B direct to the basin or sink, as shown, and yet its vent E will be readily accessible for connecting to the ventilating-pipe or disconnecting therefrom for repairs without removing the trap or disconnecting it from the basin. It will further be observed that by forming the vent E in the described relation to the other parts of the trap no suction will be exerted by the inflowing air from pipe I upon the water-seal when the part D is discharging water from the basin, as is the case where the vent is placed over or partly over said seal, so that the siphoning or emptying of the water in bend C and consequent escape of noxious gases therethrough is obviated, and when pipe D is emptied the gases arising therethrough will be conducted off by said pipe I.

The practical advantages of my improved trap are obvious from the foregoing.

Having described my invention, what I claim as new is—

A sewer-trap formed integral and consisting of a vertical portion, B, adapted to receive a coupling on its upper end, a U formation at its base, having a tap at the lower extremity thereof, an outwardly and upwardly directed branch, E, terminating at its upper end in a double-flanged portion, a downwardly-directed branch, D, and a broad swell, e, at the junction of the branches E and D, all constructed and adapted to operate substantially in the manner and for the purposes described.

In testimony that I claim the foregoing as my own I affix my signature in presence of two witnesses.

N. BARRY, JR.

Witnesses:
P. J. BARRY,
JOHN POEHLE.